US008016463B2

(12) United States Patent
Jordan, III et al.

(10) Patent No.: US 8,016,463 B2

(45) **Date of Patent: *Sep. 13, 2011**

(54) TRANSOM DRAIN LIGHT

(75) Inventors: Robert Thomas Jordan, III, Tequesta, FL (US); Michael W. Townsend, Tequesta, FL (US)

(73) Assignee: Tojo Sea Below, LLC, Tequesta, FL (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/427,462

(22) Filed: Apr. 21, 2009

(65) Prior Publication Data

US 2009/0290366 A1 Nov. 26, 2009

Related U.S. Application Data

(63) Continuation-in-part of application No. 11/617,328, filed on Dec. 28, 2006, now Pat. No. 7,520,644.

(51) Int. Cl.

*B60Q 1/00* (2006.01)

*F21V 1/00* (2006.01)

(52) U.S. Cl. ........................................................ 362/477

(58) Field of Classification Search .................. 362/477

See application file for complete search history.

(56) References Cited

U.S. PATENT DOCUMENTS

| | | | |
|---|---|---|---|
| 4,445,163 | A | 4/1984 | Ziaylek, Jr. |
| 4,954,932 | A | 9/1990 | Isenga |
| D315,417 | S | 3/1991 | Ziaylek, Jr. |
| 5,045,978 | A | 9/1991 | Gargle |
| 5,800,041 | A | 9/1998 | Poggi |
| 6,115,060 | A | 9/2000 | Rowley |
| 6,616,291 | B1 | 9/2003 | Love |
| 6,883,944 | B2 | 4/2005 | LeBoeuf |
| 7,044,623 | B2 | 5/2006 | Olsson et al. |
| 7,125,146 | B2 | 10/2006 | Willis et al. |
| 7,396,139 | B2 | 7/2008 | Savage |
| 2007/0279912 | A1 | 12/2007 | Urquhart |

*Primary Examiner* — Jason Moon Han

(74) *Attorney, Agent, or Firm* — McHale & Slavin, P.A.

(57) ABSTRACT

Disclosed is an underwater lighting apparatus securable in the transom drain hole of a vessel. The apparatus is formed from a support structure having a chamber for housing at least one LED or the like lighting element. An outer surface of the support structure is sized and arranged to sealingly secure to the transom drain hole of a conventional boat to prevent water passage. The apparatus includes an internal power source, namely disposable cell batteries or a rechargeable cell, for providing power to the lighting element.

16 Claims, 5 Drawing Sheets

TRANSOM DRAIN LIGHT

CROSS-REFERENCE TO RELATED APPLICATIONS

This application is a continuation-in-part of application Ser. No. 11/617,328, filed Dec. 28, 2006, now U.S. Pat. No. 7,520,644 and entitled Transom Drain Light, the entirety of which is incorporated herein by reference.

FIELD OF THE INVENTION

This invention relates to the field of underwater lighting and, more particularly, to an underwater lighting device that mounts into a transom drain hole on a marine vessel.

BACKGROUND OF THE INVENTION

More recently the industry has found various ways of mounting lights beneath the waterline on a marine vessel. Mounting of a light beneath the waterline requires that a hole be placed through the hull of a vessel and that proper sealing takes place to prevent water from penetrating the hull. Such lights are relatively expensive and require professional installation. Once installed, an underwater light provides countless hours of entertainment. Illumination also enhances the safety around the vessel, providing illumination to otherwise difficult to see low light level conditions. All known lighting devices secured to a vessel hull are based on thru-hull fittings which makes them extremely expensive.

The thru-hull fitting is a uniquely designed construction capable of preventing water entry yet provides an unobstructed window for passage of light from a halogen lamp, light emitting diode (LED), or any other type of lighting element employed. For instance, U.S. Pat. No. 7,044,623 discloses an underwater lighting device based on a specialty thru-hull vessel fitting. The fitting includes a flange placed on the outside of the vessel hull and an inner flange employing a jacking plate. The jacking plate is used to squeeze the hull between two flanges; a window panel is permanently with the outer flange. If the window panel is scratched, breached, or damaged, replacement of the entire thru-hull is required. Thru-hull mounted underwater lights are expensive to manufacture and install, but also have inherent problems resulting from placement of multiple holes through the hull of a vessel. Larger vessels may have multiple lights placed in the transom of the vessel. If the vessel is left in the water, the underwater light is exposed to the elements at all times wherein growth can cover the light. Further, improper grounding can lead to galvanic action that, if left unchecked, is known to sink vessels.

Underwater lights for smaller vessels would provide the occupants with the same enjoyment received from placement on larger vessels, however, smaller boats may not have the space or hull thickness capable of supporting a transom mounted lighting device.

Thus, what is needed in the industry is an underwater light that can be installed in smaller marine vessels without the need for installing additional thru-hull fittings.

SUMMARY OF THE INVENTION

Disclosed is an underwater lighting apparatus securable in the transom drain hole of a marine vessel. The lighting apparatus replaces a conventional drain hole plug used to provide drainage of a marine vessel when the vessel is removed from water. The lighting apparatus is based on a support structure defined by a first end and a second end with a continuous side wall therebetween. An outer surface of the side wall is sized and arranged to sealingly secure to the transom drain hole. An inner surface of the side wall forms a chamber between the first end and the second end for housing at least one lamp electrically isolated from the support structure and preferably potted in the chamber. The lamp may be a sealed lighting element such as a halogen lamp, an LED, or any other lighting element positioned along the first end of the chamber providing illumination outwardly therefrom.

The power source for the lighting element is housed in the chamber. The power source for the underwater lighting apparatus includes either standard or rechargeable batteries. Placement of the light in the existing drain hole of a vessel eliminates the need for professional installation and allows a small vessel to receive the same enjoyment that underwater lighting provides to the large vessels. The light may include a shape to accommodates multiple LED and be of an ornamental design. The lighting device may include a drain hole and plug, thus allowing the LED or the like lighting device to remain in the transom drain hole yet provide a means for draining of water when the vessel is dry docked.

Accordingly, it is an objective of the instant invention to provide a low cost underwater lighting apparatus that can be installed in the transom drain hole of a marine vessel.

It is a further objective of the instant invention to provide an underwater lighting apparatus that can be easily removed from a vessel to allow for drainage when the vessel is dry docked, as well as allow for cleaning, repair, or storage of the underwater light.

It is yet another objective of the instant invention to teach the use of the transom drain hole as a support aperture for holding of lighting elements, such as a halogen, LED or other lighting element.

It is a still further objective of the invention to teach the use of the transom drain hole as a conduit passageway allowing for the positioning of oversized lighting elements on the transom wall of a vessel hull.

It is still another objective of the instant invention is to provide an underwater lighting apparatus that can be installed with the same fasteners used to install a drain hole plug.

It is yet still another objective of the instant invention is to provide an underwater lighting apparatus that can be removed and replaced to vary color and/or intensity.

It is another objective of the instant invention is to provide a support structure that is made of a material compatible with the existing drain hole to prevent galvanic reaction and permit sealing replacement of the existing drain hole plug.

It is yet still another objective of the instant invention is to provide an underwater lighting apparatus for marine vessels powered by outboard motors, inboard/outboard motors, or even inboard motors wherein the lighting device allows for the viewing of the outboard motor propeller(s) in low level light conditions by placement through a transom drain hole.

It is yet still another objective of the instant invention to provide an underwater lighting apparatus having rechargeable batteries which connects to an external source for recharging from a 120-volt AC current power source or a 12 or 18-volt DC power source, such as commonly found in vessels.

It is yet still another objective of the instant invention to provide an underwater lighting apparatus having an interchangeable power source from rechargeable batteries to standard batteries.

It is yet still another objective of the instant invention to having interchangeable lens on the first end of the lighting apparatus for shattering the light emitted from the lighting element in a desired path. For instance, a concave lens will spread the light rays passing therethrough; and a convex lens will cause the light rays to deviate inward, bringing the rays of light to a focus point.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto. For clarity of this specification, the embodiment described will detail the use of a lighting assembly for use in combination with the window housing of the instant invention.

Figure 1:
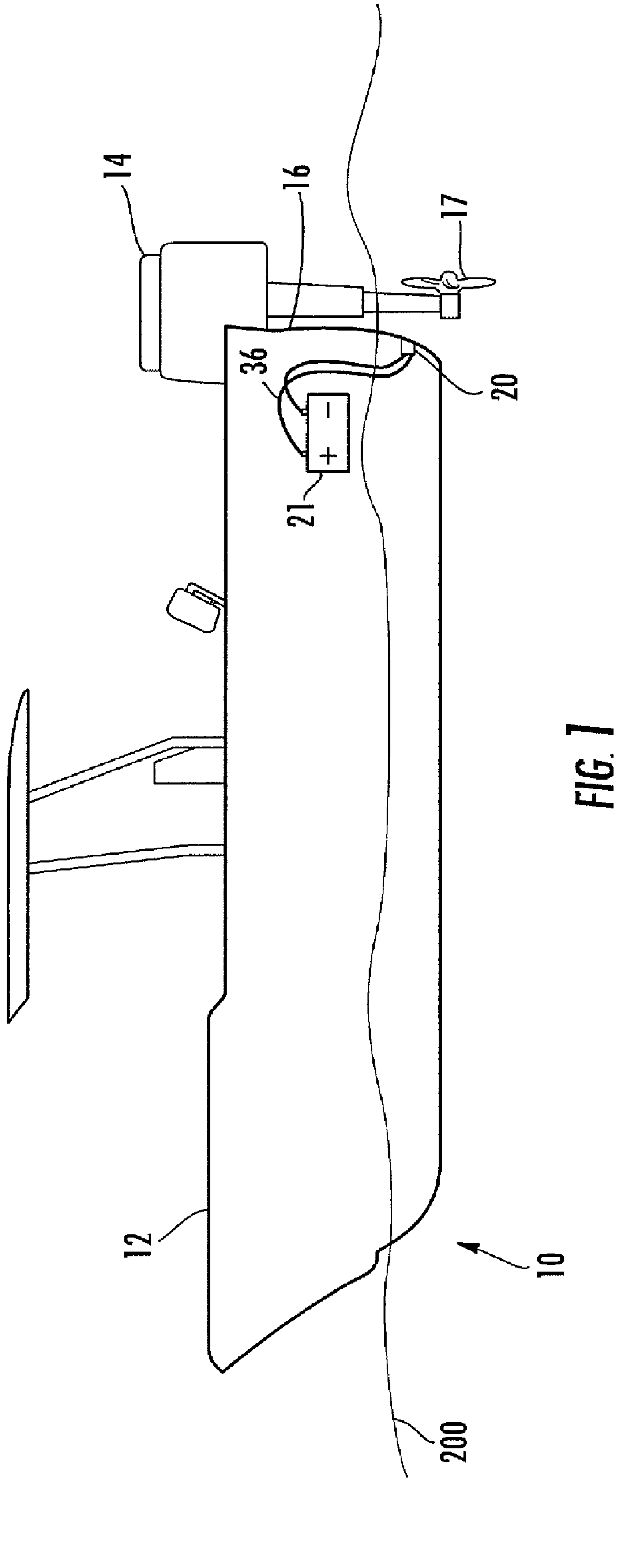
FIG. 1 is a pictorial view of a marine vessel with a transom drain light.

Referring to FIG. 1 set forth is a marine vessel (10) consisting of a vessel hull (12), and at least outboard engine (14) secured to a transom wall (16). A waterline (200) is depicted illustrating the placement of a propeller (16) submerged beneath the waterline (200). The transom drain light (20) of the instant invention is shown illuminating water from the rear of the transom (16). Preferably the power source for the transom drain light is a battery (21) electrically coupled to the lights by electrical wires (36). It should be noted that while the illustration depicts a boat having outboard engines, the invention is directed to any boat having a transom drain hole. This includes inboard/outboard powered boats, as well as inboard powered boat and jet boats.

Figure 2C:
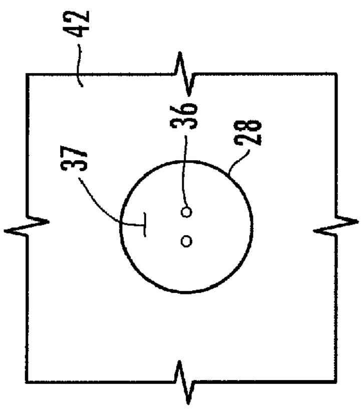
FIG. 2*c* is a rear view of the transom drain light depicted in FIG. 2*b;*
Figure 2B:
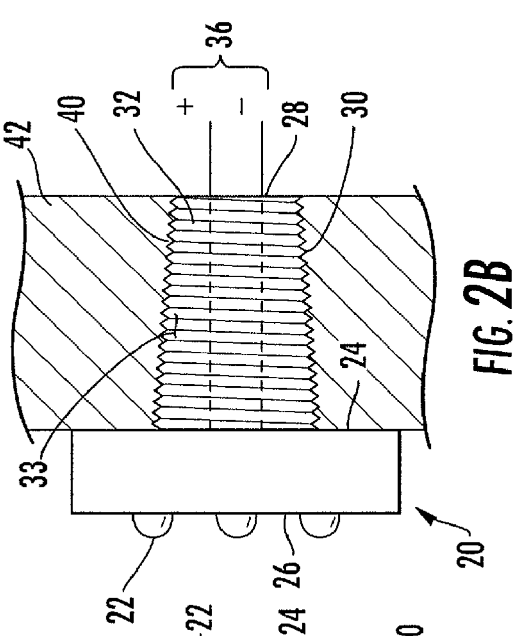
FIG. 2*b* is a cross sectional side view of a threaded transom drain light.
Figure 2A:
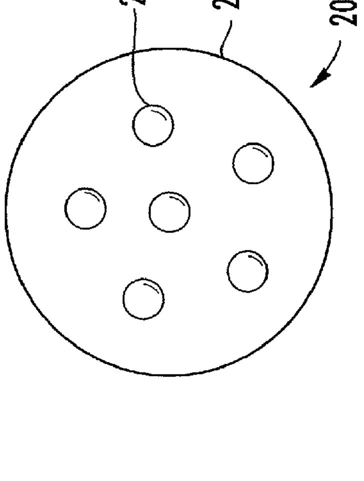
FIG. 2*a* is a front view of a transom drain light.

Now referring to FIGS. 2*a*, 2*b*, and 2*c* shown is a first embodiment of the instant invention wherein the transom drain light (20) includes at least one light-emitting diode (LED) (22) mounted in a support structure (24). The support structure has a first end (26) and a second end (28) with a continuous side wall (30) formed therebetween. The support structure may be sized to hold a single LED or a plurality of LED's. The support structure (24) may be square, round, semi-round shape, or have an ornamental shape such as a fish, boat, tree and so forth.

An inner surface (32) of the side wall (30) forms a chamber that operates as a passageway for the electrical wires (36). The electrical wires are potted within the chamber to prevent chafing and water passage. The wires are preferably potted with an isolating material such as natural or synthetic elastomers, nitro rubber, fluoroelastomers, silicone, or plastic. The outer surface (30) of the side wall is sized to sealingly secure to the transom drain hole (40) of a marine vessel transom (42). In this embodiment the outer surface (30) includes tapered threads to eliminate the need for additional sealing materials wherein the use of threads create a water tight seal found on conventional threaded transom drain plugs. In operation power is supplied through the electrical wires (36) from a low voltage direct current source as provided by a conventional boat battery (21) in either 12 volt or 24 volt levels. The first end (24) may include a single LED and be sized the same as the outer surface (30) of the continuous side wall or, as shown, be enlarged so as to carry multiple LED's. The support structure (24) may be constructed from most any material but preferably made of either aluminum, stainless steal, titanium, bronze, brass, plastic, celcon or combinations thereof.

Figure 3C:
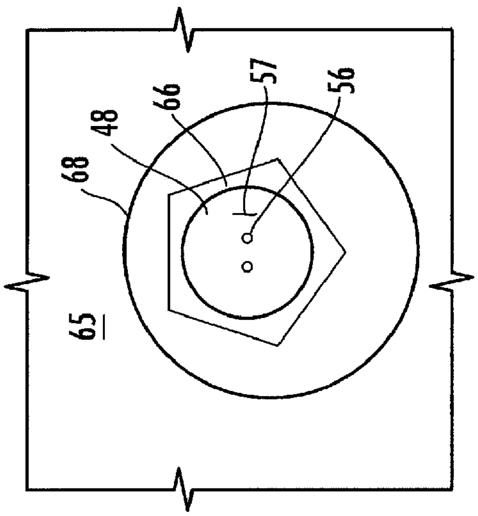
FIG. 3*c* is a rear view of FIG. 3*b;*
Figure 3B:
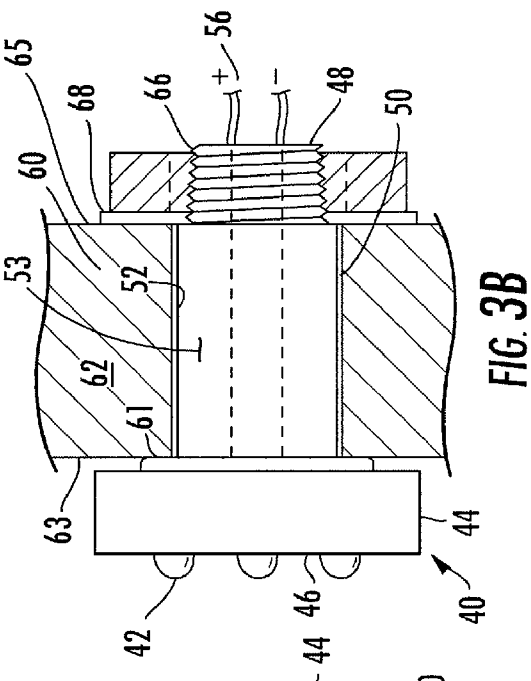
FIG. 3*b* depicts a second embodiment of a transom drain light that is bolted to a transom.
Figure 3A:
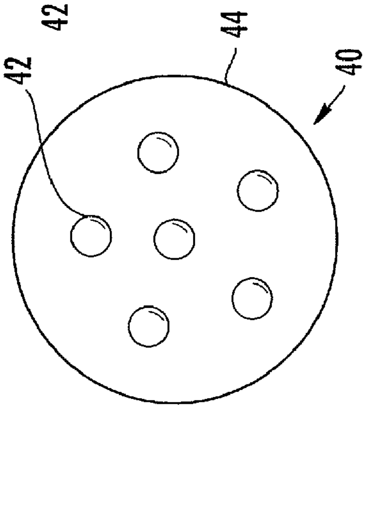
FIG. 3*a* is a front view of a second embodiment with a transom drain light.

Now referring to FIGS. 3*a*, 3*b*, and 3*c* shown is a second embodiment of the instant invention wherein the transom drain light (40) includes at least one light-emitting diode (LED) (42) mounted in a support structure (44). The support structure has a first end (46) and a second end (48) with a continuous side wall (50) formed therebetween. The support structure (44) may be square, round, semi-round shape, or have an ornamental shape.

An inner surface (52) of the side wall (50) forms a chamber that operates as a passageway for the electrical wires (56). The electrical wires are potted within the chamber to prevent chafing and water passage. The wires are preferably potted with an isolating material as mentioned above. The outer surface of the side wall (50) is sized to sealingly secure to the transom drain hole (60) of a marine vessel transom (62). In this embodiment the outer surface (50) is smooth thus requiring first seal 61 between the support 46 and outer transom wall (63); and a second seal 68 adjacent to the inner transom wall (65). The second end of the light is treaded (66) and by use of an attachment nut (70), the light assembly is secured to the transom (62) sandwiching the transom (62) therebetween. In operation, power is supplied through the electrical wires (56) from a low voltage direct current source as provided by a conventional boat battery in either 12 volt or 24 volt levels. The first end (46) may include a single LED and be sized the same as the outer surface (50) of the continuous side wall or, as shown, be enlarged so as to carry multiple LED's. The support structure (44) may be constructed from most any material but preferably made of either aluminum, stainless steal, titanium, bronze, brass or combinations thereof.

Figure 4C:
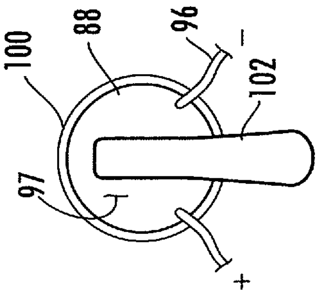
FIG. 4*c* is a rear view of FIG. 4*b;*
Figure 4B:
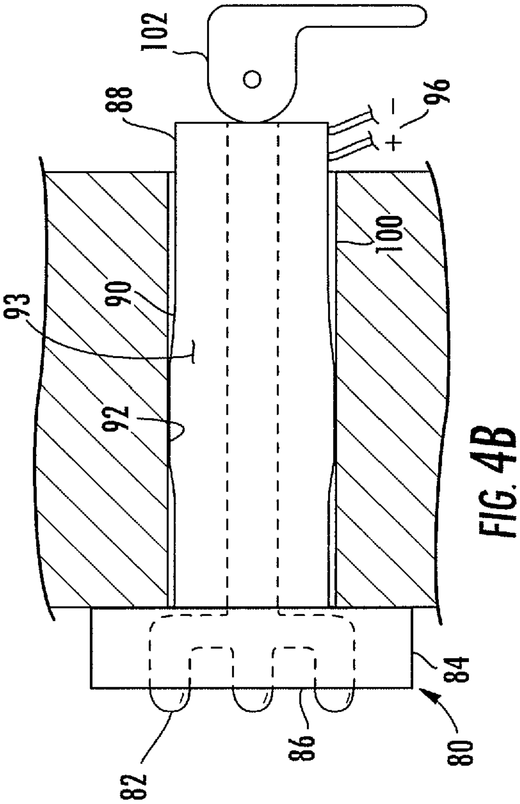
FIG. 4*b* is a cross sectional side view of a third embodiment of a transom drain light having an expandable seal.
Figure 4A:
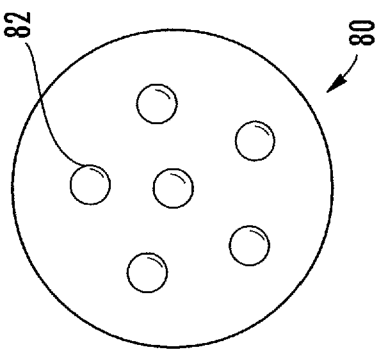
FIG. 4*a* is a third embodiment of a transom drain light.

Now referring to FIGS. 4_a_, 4_b_, and 4_c_ shown is a third embodiment of the instant invention wherein the transom drain light (80) includes at least one light-emitting diode (LED) (82) mounted in a support structure (84). The support structure has a first end (86) and a second end (88) with a flexible side wall (90) formed therebetween. The support structure (84) may be square, round, semi-round shape, or have an ornamental shape.

An inner surface (92) of the side wall (90) forms a chamber that operates as a passageway for the electrical wires (96). The electrical wires are sealed within the chamber to prevent chafing and water passage. The outer surface of the side wall (90) is made of a flexible material, such as neoprene, that is sized to sealingly secure to the transom drain hole (100) of a marine vessel transom (62). In this embodiment the outer surface side wall (90) engages the drain hole by use of a conventional flip handle style tightening lever 102 which may be a threaded t-handle or, as depicted, a flip handle tightening lever.

In operation, power is supplied through the electrical wires (96) from a low voltage direct current source as provided by a conventional boat battery in either 12 volt or 24 volt levels. The first end (86) may include a single LED and be sized the same as the outer surface (90) of the continuous side wall or, as shown, be enlarged so as to carry multiple LED's. The support structure (84) may be constructed from most any material but preferably made of either aluminum, stainless steal, titanium, bronze, brass or combinations thereof.

Figure 5:
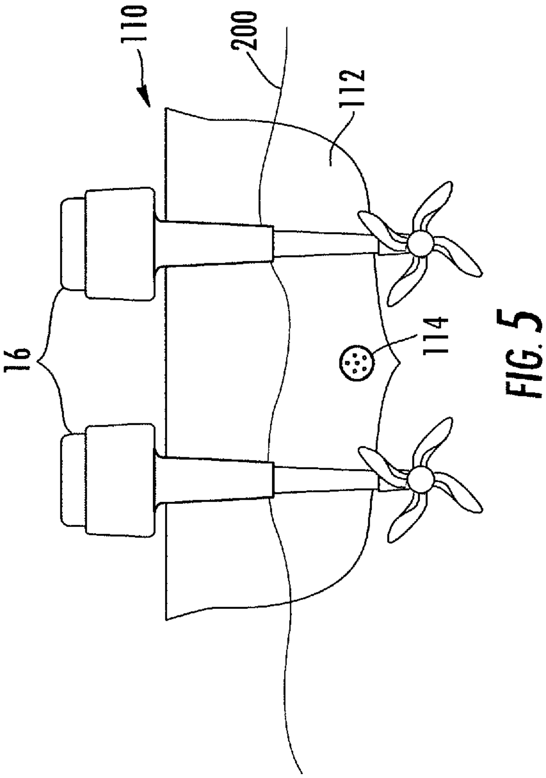
FIG. 5 is a rear pictorial view of a marine vessel having a transom drain light of the first embodiment installed.

Now referring to FIG. 5 shown is a pictorial transom view of a marine vessel (10) having a transom (20) and engines (16). In this configuration the engines are shown in duplex and the vessel (110) is partially submerged beneath the waterline (200). The transom drain light (20) is located in a area that has little or no pressure and ideally suited to allow illumination of items behind the vessel as well as propeller conditions when operating in low illumination situations.

Figure 6:
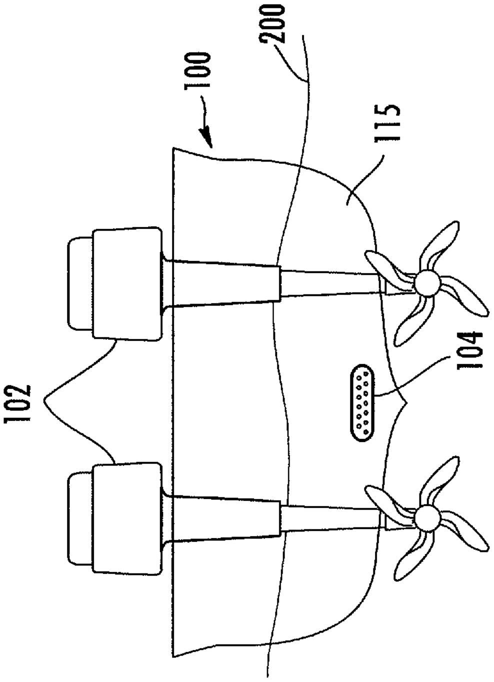
FIG. 6 is a pictorial rear view of a elongated transom drain light.

Now referring to FIG. 6 shown is a transom pictorial view showing a vessel (100) having two engines secured to the transom and a transom drain light (104) located there between. The transom light in this embodiment is elongated and may be further secured to a transom by a single tap screw, adhesive, frictional engagement, tabbed slot, or the like so as to prevent rotation of the light once positioned. As with the previous embodiments the vessel illuminates beneath the waterline (200) but with greater intensity by use of multiple LED's. Alternatively, the illumination source may be a Halogen light, strobe, fiber optic or high intensity discharge (HID) lights.

Figure 7C:
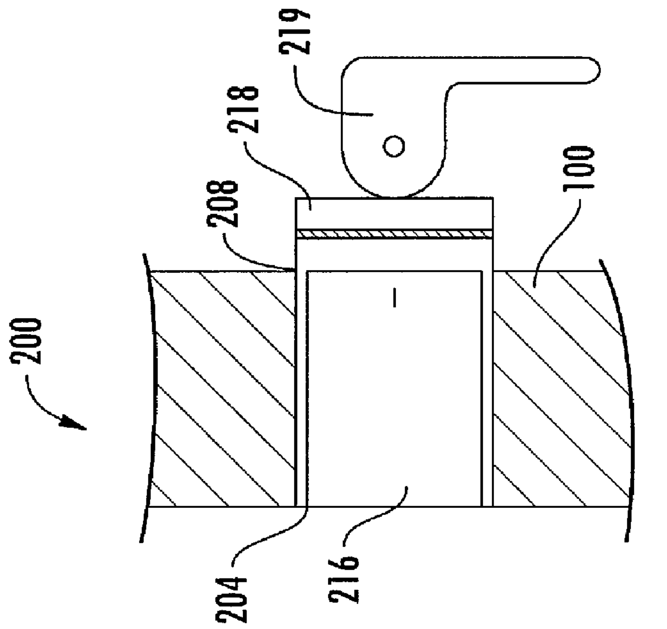
FIG. 7*c* is a cross sectional side view of the second end of the support structure of the transom drain light having an expandable seal.
Figure 7B:
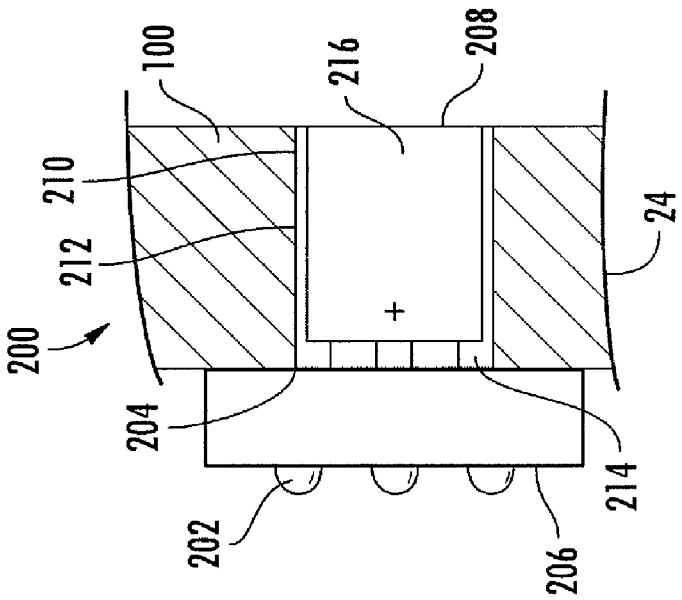
FIG. 7*b* is a cross sectional side view of the first end of the support structure of the transom drain light.
Figure 7A:
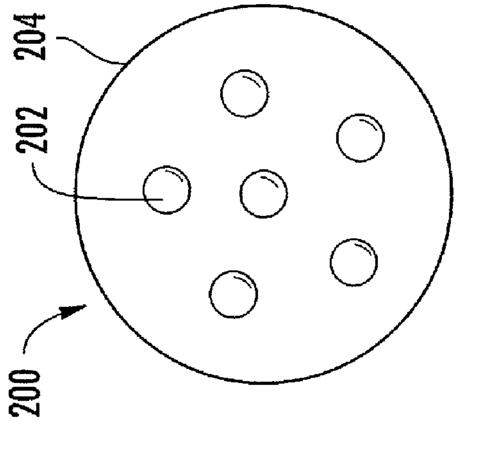
FIG. 7*a* is a front view of a transom drain light.

The lights of the instant invention can also be powered by a rechargeable battery, similar to use of batteries used in flashlights, power drills, saws, or the like portable equipment. Referring to FIGS. 7_a_, 7_b_, and 7_c_ shown is yet another embodiment of the instant invention wherein the transom drain light (200) includes at least one light-emitting diode (LED) (202) mounted in a support structure (204). The support structure (204) has a first end (206) and a second end (208) with a continuous sidewall (210) formed thereinbetween. The support structure (204) may be sized to hold a single LED or a plurality of LED's. The first end (206) may include a single LED (202) and be sized the same as the outer surface (212) of the continuous sidewall (210) or, as shown, be enlarged so as to carry multiple LED's (202). The illumination source (202) may be a sealed to prevent the passage of water therethrough. Alternatively, the illumination source may be a Halogen light, strobe, fiber optic or high intensity discharge (HID) lights. The support structure (204) may be square, round, semi-round shape, or have an ornamental shape such as a fish, boat, tree and so forth. The support structure (204) may be constructed from most any material including plastic but preferably is made of aluminum, stainless steel, titanium, bronze, brass or combinations thereof. An inner surface (214) of the sidewall (210) forms a chamber that operates as a holder of disposable batteries or as a holder of rechargeable batteries. Alternatively the power source (216) can be interchangeable between rechargeable batteries and standard disposable batteries. The power source (216) may be one battery or a plurality of batteries. In operation, the power source (216) maintains an abutment with the illumination source (202). The outer surface (212) of the sidewall (210) may be constructed of a flexible material, such as neoprene, that is sized to sealingly secure to the transom drain hole (100) of a marine vessel transom (16). In this embodiment, the outer surface sidewall (212) engages the drain hole (100) by use of a conventional flip handle style tightening lever (219) which may be a threaded t-handle or, as depicted in FIG. 7_c_, a flip handle tightening lever. The support structure (204) has a removable cap (218) at the second end (208); however, a removable cap is contemplated for the first end (206), to allow the user access to the power source (216) on the transom drain light (200). A watertight O-ring seal may be provided thereinbetween the removable cap (218) and the first or second end to preclude the entrance of water into the chamber, not shown. When no external power is connected, the batteries (216) provide current to the lighting element (202). The current through the lighting element (202) is limited by the total forward voltage drop characteristic of the lighting element (202) and the voltage available from the power source (216).

Figure 8:
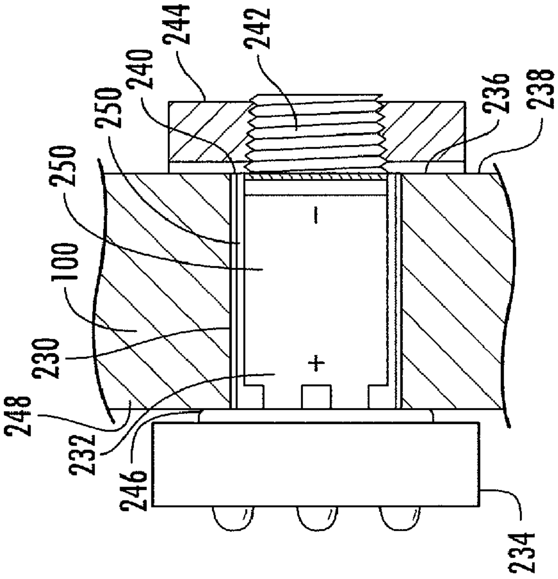
FIG. 8 is a cross sectional side view of a support structure secured to a transom by use of a threaded nut.

Now referring to FIG. 8, in this embodiment the outer surface (230) of the sidewall is smooth thus requiring first seal (232) between the support (234) and outer transom wall (232); and a second seal (236) adjacent to the inner transom wall (238). The second end (240) of the light is treaded (242) and by use of an attachment nut (244), not shown, the underwater light assembly is secured by sandwiching the outer walls of the transom (100) therebetween. The power source (250) within the chamber is interchangeable between rechargeable batteries and standard batteries. The power source (250) may be one battery or a plurality of batteries. In operation, the power source (250) maintains an abutment with the illumination source. A watertight O-ring seal (246) may be provided between the support structure (234) and the outer transom wall (248) to preclude the entrance of water into the chamber. Similarly, a watertight seal (250) may be provided between the nut (244) and the inner surface of the transom (238) to provide a tight seal.

Figure 9A:
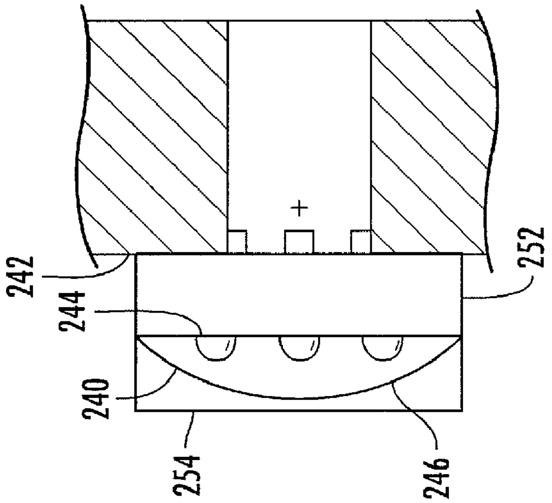
FIG. 9*a* is a cross sectional side view of the first end of the support structure of a third embodiment of a transom drain light.
Figure 9B:
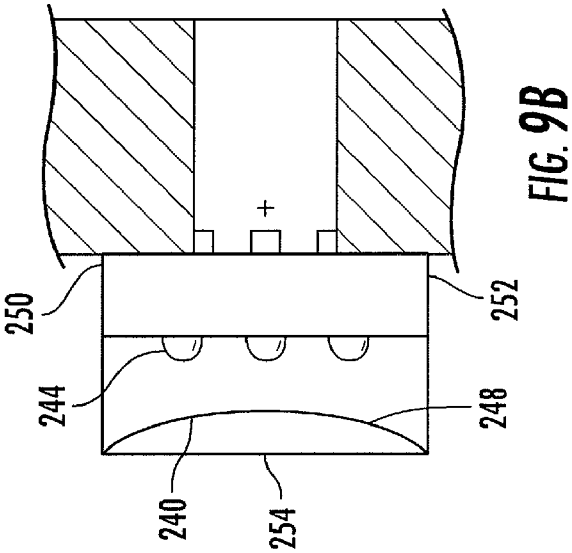
FIG. 9*b* is a cross sectional side view of the first end of the support structure of a fourth embodiment of a transom drain light.

As shown in FIGS. 9_a_ and 9_b_, an interchangeable lens (240) on the first end (242) of the lighting apparatus is provided for shattering the light emitted from the lighting element (244) in a desired path. Depending on the desired effect the user may employ the use of a concave lens (246), which will spread the light rays passing therethrough, or a convex lens (248), which will cause the light rays to deviate inward bringing the rays of light to a focus point. The lens (240) is held in held in place against the first end (250) of the support structure (252) by a lens cap (254). The first end (242) and lens cap (254) are internally mated through the used of threads, snap-fit, bayonet, or the like. Also included is an O-ring seal to assure the watertight integrity of the lighting apparatus, not shown. It is contemplated that the lighting apparatus may be turned off merely by unthreading the lens cap and disengaging the abutment between the power source and the illumination source.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. An underwater lighting apparatus securable in a marine vessel having a transom drain hole fitting positioned beneath a waterline comprising a removable drain plug and a fixed drain hole fitting configured to sealingly receive said removable drain plug, said apparatus comprising:

a support structure having a first end and a second end with a continuous side wall there between, an inner surface of said continuous side wall forming a chamber, an outer surface of said continuous side wall sized and arranged to sealingly secure to said transom drain hole fitting;

at least one lighting element disposed in said chamber, said lighting element having an illumination end positioned along a first end of said chamber;

a power source electrically coupled to said lighting element;

wherein removal of the drain plug allows the temporary placement of said support structure into said transom drain hole fitting which permits illumination of items behind the transom when said power source is energized.

2. The underwater lighting apparatus of claim 1 wherein said power source is a battery placed within said chamber.

3. The underwater lighting apparatus of claim 1 wherein said outer surface of said side wall has tapered threads.

4. The underwater lighting apparatus of claim 1 wherein said first end of said support structure includes a lamp support bracket for holding a plurality of lighting elements.

5. The underwater lighting apparatus according to claim 1 wherein said support structure is constructed from a material selected from the group consisting of aluminum, stainless steel, titanium, bronze, plastic or combinations thereof.

6. The underwater lighting apparatus according to claim 1 wherein said lighting element is at least one low voltage LED.

7. The underwater lighting apparatus according to claim 1 wherein said lighting element is a halogen lamp.

8. The underwater lighting apparatus according to claim 1, wherein said electrical element is potted with an electrical isolating material selected from the group consisting of natural or synthetic elastomers, nitrile rubber, fluoroelastomers, silicone, or plastic.

9. The underwater lighting apparatus according to claim 1, wherein said support structure allows water to drain from said marine vessel when said support structure is loosened within said transom drain hole fitting.

10. The underwater lighting apparatus of claim 1 wherein said outer surface of said side wall is flexible having a means for expanding adapted for sealing said support structure to said transom drain fitting.

11. The underwater lighting apparatus of claim 2 wherein said battery is a least one disposable cell battery.

12. The underwater lighting apparatus of claim 2 wherein said battery is a least one rechargeable battery.

13. The underwater lighting apparatus of claim 1, wherein said first end of said support structure includes a lens cap, to sealing mate a lens against said first end.

14. The underwater lighting apparatus of claim 13 including a lens positioned between said lighting element and said lens cap.

15. The underwater lighting apparatus of claim 14, wherein said lens is concave.

16. The underwater lighting apparatus of claim 14, wherein said lens is convex.

* * * * *